(12) United States Patent
Obst

(10) Patent No.: US 9,847,941 B2
(45) Date of Patent: Dec. 19, 2017

(54) SELECTIVELY SUPPRESS OR THROTTLE MIGRATION OF DATA ACROSS WAN CONNECTIONS

(71) Applicant: Quest Software Inc., Aliso Viejo, CA (US)

(72) Inventor: Jonathan Cameron Obst, Madison, WI (US)

(73) Assignee: Quest Software Inc., Aliso Viejo, CA (US)

( * ) Notice: Subject to any disclaimer, the term of this patent is extended or adjusted under 35 U.S.C. 154(b) by 221 days.

(21) Appl. No.: 14/731,252

(22) Filed: Jun. 4, 2015

(65) Prior Publication Data

US 2016/0359746 A1    Dec. 8, 2016

(51) Int. Cl.
*G06F 15/16* (2006.01)
*H04L 12/801* (2013.01)

(52) U.S. Cl.
CPC .................................. *H04L 47/10* (2013.01)

(58) Field of Classification Search
CPC . G06F 11/1461; G06F 11/1464; G06F 11/146
See application file for complete search history.

(56) References Cited

U.S. PATENT DOCUMENTS

| | | | |
|---|---|---|---|
| 7,251,680 B2 | 7/2007 | DeVos | |
| 7,406,455 B1 | 7/2008 | Gruen et al. | |
| 9,311,679 B2 | 4/2016 | Shih et al. | |
| 2002/0073080 A1 | 6/2002 | Lipkin | |
| 2004/0068545 A1 | 4/2004 | Daniell et al. | |
| 2008/0275764 A1 | 11/2008 | Wilson et al. | |
| 2013/0332505 A1* | 12/2013 | Karandikar | H04L 67/1002 709/202 |
| 2015/0172120 A1 | 6/2015 | Dwarampudi et al. | |
| 2016/0342350 A1 | 11/2016 | Shoultz | |
| 2016/0359953 A1 | 12/2016 | Lervik | |

OTHER PUBLICATIONS

U.S. Appl. No. 14/719,224, Nathan N. Shoultz, Processing Unknown or Unexpected Properties Encountered During Migration or Archiving Operations, filed May 21, 2015.
U.S. Appl. No. 14/731,721, Lars J. Lervik, Migration Enhanced by Presence, Instant Messaging, and Last Log-On Time, filed Jun. 4, 2015.
U.S. Appl. No. 14/719,224 Office Action dated May 19, 2017.

* cited by examiner

*Primary Examiner* — Bryan Lee
(74) *Attorney, Agent, or Firm* — Maschoff Brennan

(57) ABSTRACT

Systems and methods for detecting and evaluating data migrations over a network are described. More specifically, a Migration Manager is provided to detect data migrations over the network and determine whether the performance of the data migration is satisfactory. In situations where the current data migration is too slow, the Migration Manager may postpone or reschedule the data migration for another time.

20 Claims, 4 Drawing Sheets

SELECTIVELY SUPPRESS OR THROTTLE MIGRATION OF DATA ACROSS WAN CONNECTIONS

BACKGROUND OF THE INVENTION

Field of Invention

The present invention generally relates to data migration. More specifically, the present invention relates to selectively suppressing or throttling migration of data across WAN connections.

Description of the Related Art

Data migration can be viewed as a process for transferring data between one or more computer systems and storage devices. Data migration may be performed for several reasons including providing backup copy of the data and consolidating data over different systems and devices into one central location. Data migration may also be performed to provide information from one computer system to a new computer system so that the new computer system also has access to the migrated data.

Generally, data migration is performed through the use of a processor and corresponding data migration software run on the processor. The data migration software allows the data migration to be performed in an automated fashion. To achieve an effective data migration, the data migration software also maps between locations where the data is originally stored (e.g., a source system) and where the data will be written (e.g., a target system). The data migration software further evaluates the format of the data being extracted from its original storage location (e.g., the source system) and a requested format of the data corresponding to the location where the data will be written to (e.g., the target system).

Data migration may be performed for large amounts of information. The data may also be extracted from various different sources. For example, a business may want to perform data migration for all its employee workstations in order to back-up the data. There may be situations, however, where extraction from one or more different sources is slow. Such situation may occur when the data migration performs extraction for one or more of the different sources using a network connection that is slower than normal. These situations may arise, for example, if a source is on a separate slow network (e.g., an employee is working remotely) or if the network is currently busy completing other tasks (e.g., simultaneous upload and/or downloads on the same network). There may also be situations where the network being used for the data migration has failed.

For these situations where the network is slower than normal, there is currently nothing that is done differently regarding the network speed during data migration. More specifically, the automated process for data migration continues to perform the instructed data migration until completion. For the scenarios where the network is busy, data migration for large amounts of data coming from one or more sources may take up large amounts of available network capabilities from other concurrently running processes. There is a need to further implement an evaluation for the automated data migration process that can determine whether data migration can be carried out. In situations where the data migration is determined to be sub-optimal, the data migration may be rescheduled for a later time.

SUMMARY OF THE CLAIMED INVENTION

A method for detecting and suppressing slow data migration across WAN connections is claimed. The method includes first detecting a current data migration between a first source of the source system. The current data migration of the first source is evaluated based on a threshold that corresponds to a pre-defined performance level for the data migration that is acceptable. In situations where the data migration for the first source is below the acceptable performance level threshold, a Migration Manager terminates the current data migration and reschedules the data migration of the first source for a future time.

A system for detecting and suppressing slow data migration across WAN connections is claimed. The system includes a source system that has the data to be migrated and a target system where the data will be migrated to. The system also includes a Migration Manager that first detects a current data migration between a first source of the source system. The current data migration of the first source is evaluated based on a threshold that corresponds to a pre-defined performance level for the data migration that is acceptable. In situations where the data migration for the first source is below the acceptable performance level threshold, the Migration Manager terminates the current data migration and reschedules the data migration of the first source for a future time.

DETAILED DESCRIPTION

The systems and methods described herein are directed towards data migration over a network. More specifically, the systems and methods are directed towards detecting and evaluating data migration for a particular source over the network. The detections and evaluations are used to determine whether the current data migration should be continued. Generally, a network can facilitate a scheduled data migration at an expected speed associated based on characteristics of the network. In some situations, data migration for one or more sources may be significantly slower than other sources over the same network. The slower speed may be attributed to a variety of reasons such as a busy or weak network connection. These situations may come up unexpectedly and therefore cannot be planned for in advance when scheduling the data migration. It may be more desirable, in these cases, to postpone and reschedule the data migration of the sources having the slower speeds.

Figure 1:
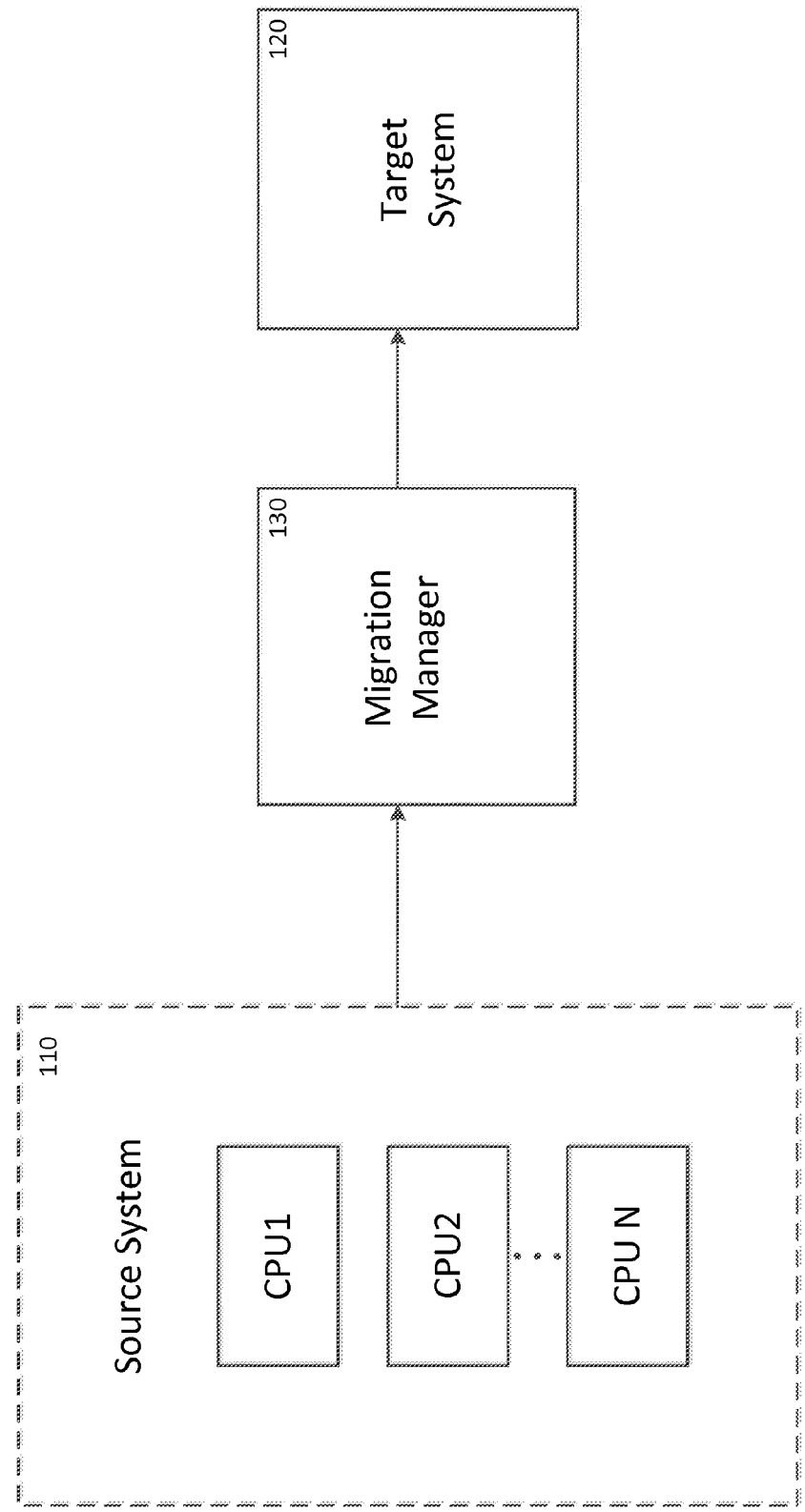
FIG. 1 illustrates a system for data migration between various computing devices and storage using the Migration Manager.

FIG. 1 illustrates a system 100 for data migration between a source system 110 and a target system 120. The source system 110 may include one or more sources such as computing devices (e.g., laptop, desktop, mobile device). The source system 110 may have various types of data stored locally in memory associated with each computing device. For example, the data (e.g., PST data) may be associated with an application (e.g., e-mail) stored on the computing device. The data stored in the source system 110 can be selected for migration from the source system 110 to the target system 120. In some cases, the data migration may occur at a pre-scheduled day and time to ensure that the data is available and not in use (e.g. after business hours).

The target system 120 may be a storage device or a server. The target system 120 can be used to store the data being migrated from the source system 110. Data migration may be performed for a variety of reasons. In some cases, data from the source system 110 may be stored on the target system 120 in order to provide a back-up copy of the data. The data can also be stored on the target system 120 in order to have all of a particular set of data in one common location.

In some embodiments, the target system 120 can also be another computing device. For example, a user may wish to migrate data stored in one computing device to another computing device (e.g., the target system 120). In this way, the data that was migration can also be used with the other computing device that was the target of the data migration. A user may wish, for example, that the archived mail stored in the first computing device be migrated to a second device. The data migration may also transfer archived mail between different types of devices, applications, and formats.

The system 100 performs the data migration between the source system 110 and the target system 120 by using a Migration Manager 130. As described herein, the Migration Manager can be viewed as a collection of different functionalities that all facilitate data migration. The Migration Manager 130 may be implemented as a computing device that includes its own processor and memory. The Migration Manager 130 can carry out scheduled data migrations based on instructions stored in memory of the Migration Manager 130. These instructions may include identifying the data to be migrated, from which sources the data is to be migrated, and the time when the data migration is to occur. In other embodiments, an administrator (e.g., an individual responsible for managing and operating the Migration Manager 130) may customize the characteristics of a data migration being carried out by the Migration Manager 130. In other words, the administrator is capable of inputting information identifying the data to be migrated, where the data may be located, and when the data migration should be performed. Further details for the various features and functionalities of the Migration Manager 130 are provided below.

It should be noted that data migration may be performed with numerous different users simultaneously. The Migration Manager can obtain information from the various different users for available periods of time when data migration can be performed. The Migration Manager can schedule groups of users based on similar periods of time where data migration may be performed. It can be difficult for an administrator to manually communicate with and determine when each individual user is available and subsequently instruct the Migration Manager to perform the data migration that satisfies the time constraints for all the users in question. The Migration Manager can be instructed to obtain this information from the user in an automated fashion and subsequently schedule the data migrations based on the responses from the various users.

Figure 2:
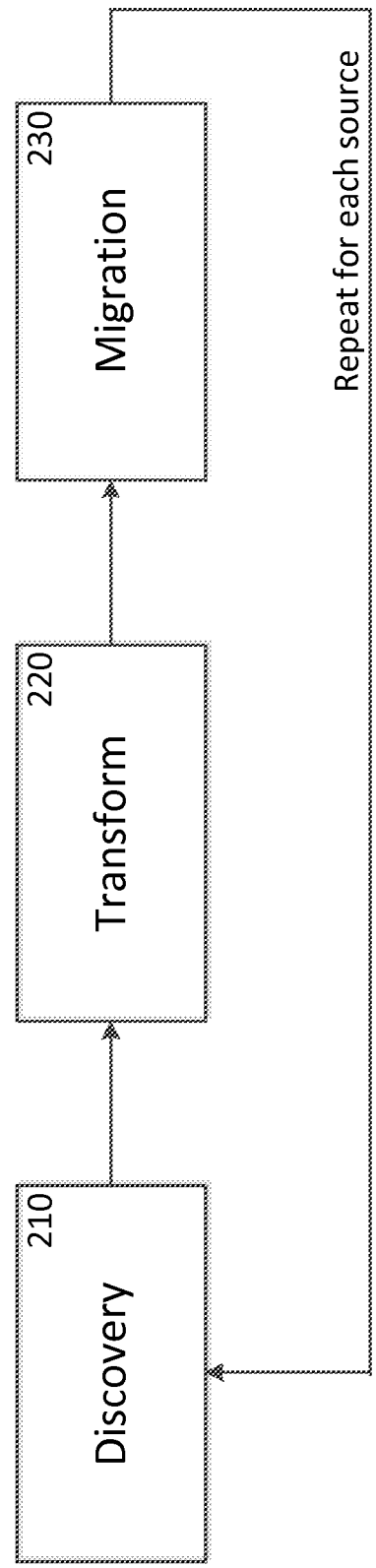
FIG. 2 illustrates a flowchart describing steps performed during data migration.

FIG. 2 illustrates a flowchart 200 describing exemplary steps performed during data migration. As noted above, data migration between the source system and the target system is performed by the Migration Manager.

Generally, the Migration Manager performs steps that fall under three broad classifications. First, the Migration Manager is instructed to discover the sets of data from one or more source systems to be migrated in step 210. This may include determining what data needs to be migrated and where the data is stored. The Migration Manager may be informed about such details (e.g., administrator identifies particular sets of data or users to migrate data from, the user identifies to the Migration Manager what data should be migrated). Second, the Migration Manager provides transformations. In particular, the transformations are used to format the data extracted from the source system to fit the format of the target system in step 220. Third, the Migration Manager extracts and subsequently writes the source data into the target system in step 230. The Migration Manager, during the data migration, may use any applicable transformation derived in step 220.

It should be noted that the flowchart 200 illustrates one embodiment of the present invention. Within each step 210-230, there may be additional steps as described herein.

With respect to step 210, the Migration Manager may be instructed to locate a particular set of data stored in one or more source systems to be migrated to the target system. As indicated above, the Migration Manager may be provided information identifying what data is to be migrated and where the data might be found (e.g., user names and corresponding computing devices). The Migration Manager can then perform searches of all possible locations in the source system for the specified data to be migrated.

Embodiments of the present invention may include data migration of PSTs (i.e. personal storage tables). Generally, PSTs correspond to a file format (.pst) associated with Microsoft software (e.g., Microsoft Exchange Client, Windows Messaging, and Microsoft Outlook). The PSTs are used to store and archive copies of data (e.g., messages, calendar events) locally on a computer from which a user is utilizing the associated Microsoft software.

Although references may be made to embodiments involving data migration of PSTs, other types of data subject to data migration may also be included. The Migration Manager is capable of receiving and carrying out discovery of various types of data stored in the source system that one might want migrated to the target system.

In one possible scenario, a business may want to migrate PST data related to work email of all employees to the target system (e.g., Microsoft Office 365). As noted above, the data may be migrated in order to provide a backup copy for situations where the data could be lost (e.g., computing device failure) or to provide a centralized location where the PST data can be accessed from. In order to extract and store the PST data to the target system, the location where the PST data is stored needs to be identified.

In order to determine where the identified data to be migrated (e.g., PST data) is stored, the Migration Manager may first scan an Active Directory to identify applicable users. The Active Directory may be a list of users associated with a particular entity that is performing the data migration. For example, a business may have an Active Directory that includes the names of all the employees who work for the business. The Migration Manager can use the Active Directory to identify the employees who are subject to the data migration. If the Migration Manager is instructed to perform migration of data for only a subset of employees (e.g., particular department), the Active Directory can also be used to identify the particular subset of employees. In other embodiments, the Migration Manager may be provided the identities of the employees who the data migration may be performed for. For example, an administrator may indicate that John Doe's PST data should be migrated to the target system.

The Migration Manager also determines where the data for the identified employees is stored. By using the Active Directory to identify the set of applicable employees, the Migration Manager can then identify the various sources where the data to be migrated may be stored. For example, the Migration Manager may look for associated computing devices associated with each employee. These computing devices (e.g., desktop, laptop, mobile device) may be assigned to each employee for work-related functions. The Migration Manager can utilize the network of the business to determine which computing devices are available. Some computing device may be connected directly to the network associated with the business. In situations where an employee is working remotely, the working device may indirectly connect (e.g., Virtual Private Network) to the network associated with the business. In any case, the Migration Manager can search for the corresponding computing devices assigned to each employee so long as the computing device is somehow connected to the same business network. In scenarios where a computing device is known to exist for a particular employee but can't be found, the Migration Manager may search for the computing device continually or at regular intervals until a period of time has elapsed.

Once the computing device has been located, the Migration Manager can then search the memory of each computing devices for the requested data to be migrated. With respect to the embodiment discussed above, the Migration Manager searches the memory of each computing device for the PST data. In other embodiments, the Migration Manager may also be instructed to look for more than just PST data.

The discovery step 210 is performed for each employee found on the Active Director for which data migration is scheduled to be performed for. The number of employees in which discovery is performed for may vary based on the need of the business. In fact, the Migration Manager is capable of customization including identifying who the data migration is performed for and what set of data is being migrated. As noted above, the customization may be controlled by an administrator (e.g., an individual associated with the business tasked with managing and operating the Migration Manager).

Step 220 involves the Migration Manager providing a transformation that can be used during data migration. Generally, the Migration Manager evaluates the format of the data from the source system and the format requirements for the target system. In some situations, the format for the data stored in the source system and the format requirements for data to be stored in the target system are distinct. Therefore, to complete the data migration, the Migration Manager may need to provide transformations for source data from its original format into a format that is accepted by the target system. This transformation process involves obtaining proprietary information regarding data formats used by the source system and the target system. The information can then be used to provide a mapping or conversions between the two formats. These derived transformations in step 220 are later used during the actual migration of the data in step 230 below.

In step 230, the data migration is performed by the Migration Manager. Generally, the Migration Manager extracts the particular data from the source system. The Migration Manager can first temporarily store the extracted data in memory associated with the Migration Manager. The Migration Manager can then perform any necessary transformations (e.g., derived above in step 220) related to the formatting of the extracted data to ensure that the data can be compatible when written into the target system. After the transformation has been performed on the data, the data is written into the target system. The extracted data that was temporarily stored in the Migration Manager can then be deleted to make room for additional data migrations.

In the embodiment described above, the PST data can be migrated from one or more sources to Microsoft 365, which is a hosted email server. As indicated above, data migration may be performed for various reasons including backing up the data (e.g., PST data). The PST data from the various source systems can also be all accumulated into one central location. The use of Microsoft 365 can also allow users to access their PST data remotely.

Figure 3:
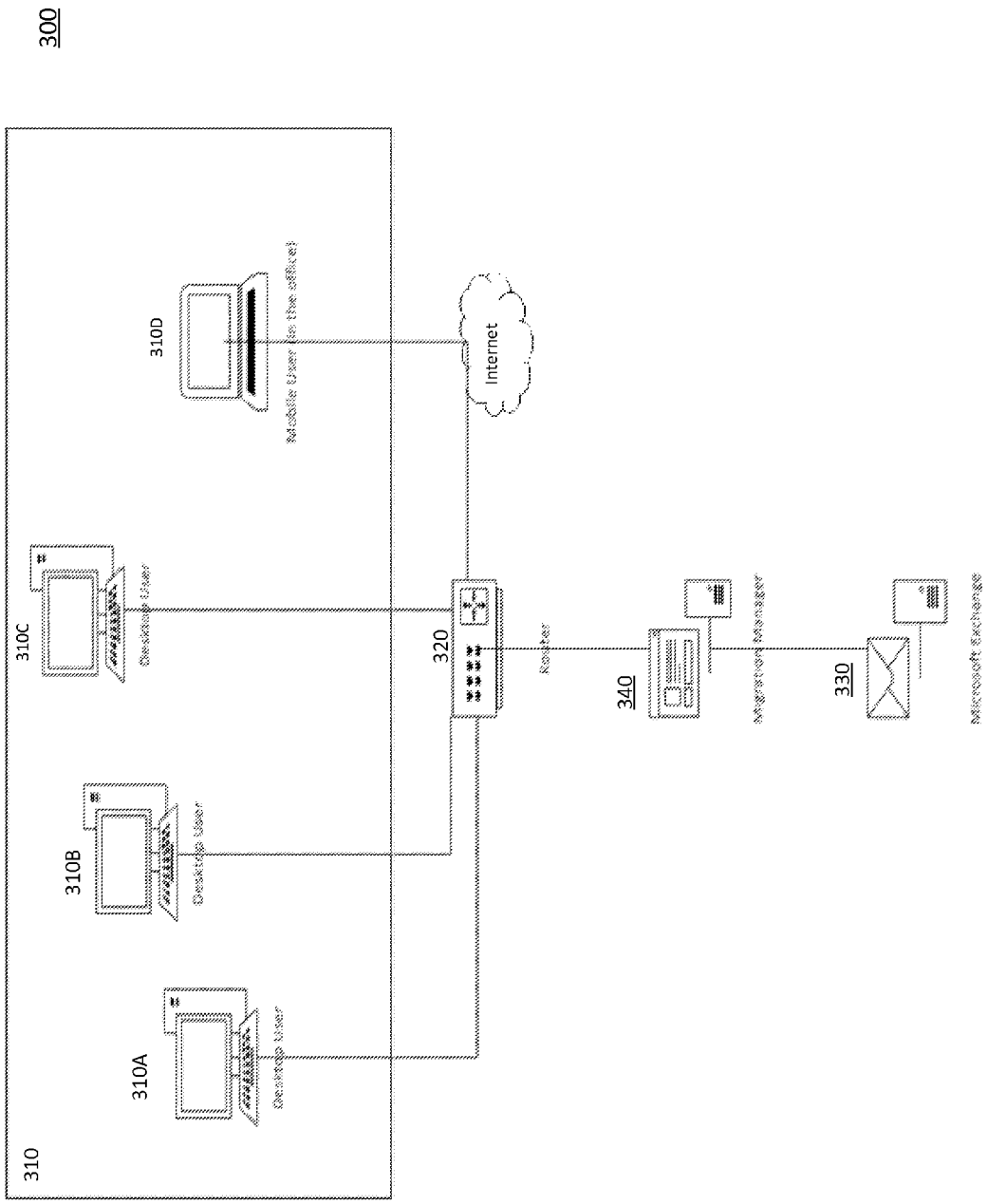
FIG. 3 illustrates a situation where suppression or throttling data migration across WAN connection is performed.

FIG. 3 illustrates a scenario 300 where suppression or throttling data migration across WAN connection is performed. As illustrated in the figure, there are a number of computing devices (e.g., desktop, mobile device) 310A-D associated with the source system 310. These computing devices are all associated with the same network 320. The network 320 may be associated with an entity (e.g., company) where each of the users of the computing devices is employed at. The network 320 may have known properties/capabilities related to processes performed on the network 320 (e.g., bandwidth, speed).

Each of the computing devices 310A-D may contain information that can be migrated to the target source 330 through the use of the Migration Manager 340. Based on the embodiment illustrated in FIG. 3, the target source 330 is a Microsoft Exchange server. It should be noted that in other embodiments, the target source 330 may be any system where data can be stored during data migration.

With each possible source 310A-D, data migration can be performed to migrate data (or sub-sets of data) stored in a particular source to the target source 330 (e.g., Microsoft Exchange). There may be situations where the data migration is performed as expected using the internal network available. Expectations may include locating and accessing the source of the data, transforming the data, and migrating the data from the source to the target system at an acceptable speed. What is expected performance wise (e.g., speed) during a data migration may depend on the available network and/or technologies that are being used by a particular entity (e.g., business). For example, a larger company may have the resources to implement a fast internal network capable of performing data migration at high speeds. In contrast, a smaller business may only be capable of using a smaller network capable of performing at lesser speeds. Therefore, a threshold indication on what can be expected and acceptable may be dependent on what the entity is using. The threshold may be customizable by the Migration Manager to reflect this dependency.

There may be situations, however, where data migration for one or more sources is slower than expected. These situations may occur, for example, when parts of the network (e.g., network associated with the one or more sources) are busy or have failed. Data migration may also be slow if a source (e.g., source 310D) is using a different network (e.g., remote access to the business network using a virtual private network (VPN) connection). In situations where the data migration is slower than usual, the Migration Manager is capable of detecting these slow speeds. Ordinarily, the Migration Manager may perform the migration regardless of the associated performance of the network. This could cause the network to be tied up by the Migration Manager for long periods of time, thereby affecting the tie up with the network. Such a scenario may represent an inefficient use of time and resources, as well as possibly also affecting other work-related uses of the network. The data may also be more susceptible of being corrupted. Therefore, it is desirable to postpone or reschedule the data migration for the sources that have slower than usual data migration performance to a later time. At the later time, the issues with the network that may have caused a slower than usual data migration (e.g., busy network, remote access) may be resolved. The rescheduled data migration can then be performed as expected, although at a later time than originally scheduled.

Figure 4:
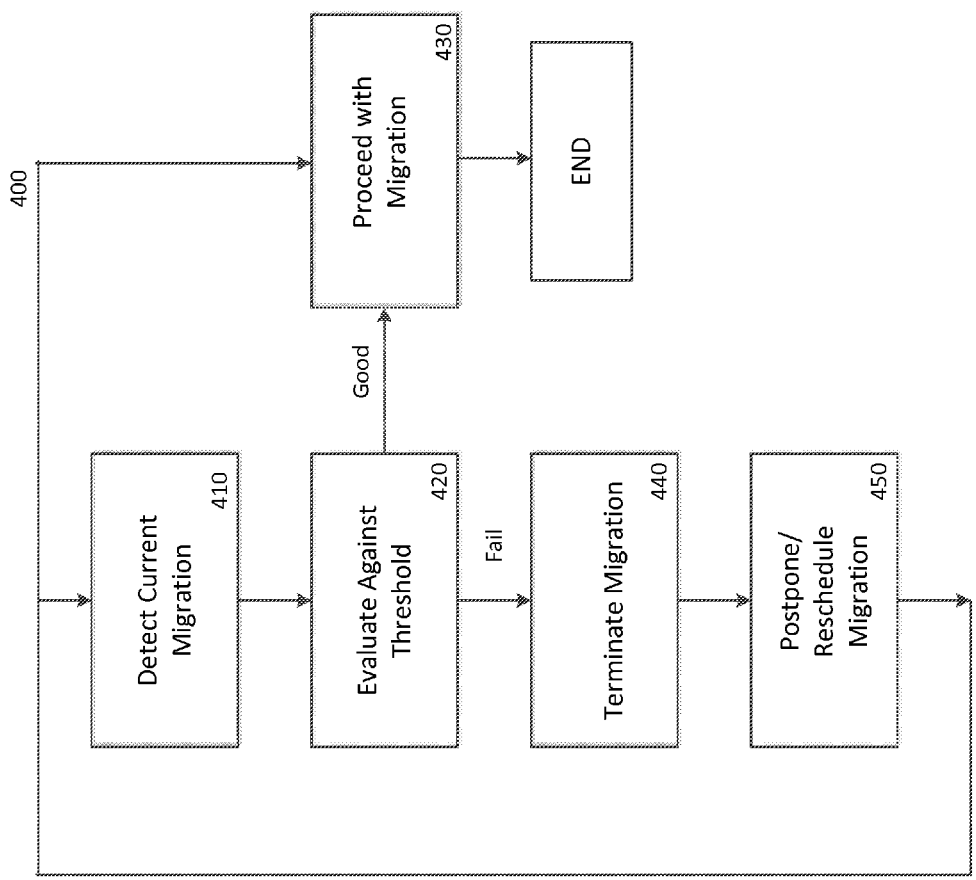
FIG. 4 illustrates a flowchart describing steps performed for suppressing or throttling data migration across WAN connection.

FIG. 4 illustrates a flow chart for suppressing or throttling the data migration. More specifically, the method of FIG. 4 describes the steps for the Migration Manager that is capable of detecting when data migration for one or more sources is being performed at a sub-optimal threshold (i.e., slower than usual). Since migrations may be scheduled beforehand, it may not be possible to foresee circumstances where data migration for one or more sources may be sub-optimal (e.g., congested network, network failure, remote access). When the data migration has been identified as being sub-optimal, however, the Migration Manager can then postpone or re-schedule the data migration for the current source being migrated for a later time. The amount of time until the next attempt for data migration for the particular affected source can be customized (e.g., a few minutes, a few hours, a few days).

Once the data has begun migration from a particular source to the target system, the Migration Manager may detect a current performance of the data migration in step 410. In particular, the Migration Manager is taking measurements that can be used to detect and evaluate whether the data migration that is currently being performed for a particular source is at an acceptable performance level (e.g., speed).

In some embodiments, the Migration Manager may monitor (e.g., take multiple measurements at regular intervals) the current data migration over a period of time in order to evaluate the up-to-date performance of the current data migration. Multiple measurements may be useful to detect whether the data migration has deteriorated below an acceptable performance level (e.g., threshold data migration).

In step 420, the Migration Manager evaluates the current performance of data migration detected in step 410 with a threshold data migration performance. As noted above, an expected performance can correspond to characteristics of a network and/or characteristics of the various sources (e.g., desktop, laptop, mobile devices) that are being used to perform the data migration. The threshold data migration may take into account the expected performance of the network under normal circumstances. In some embodiment, the Migration Manager may be instructed to flag detected data migrations that fall below a certain threshold value.

If the detected current data migration satisfies the threshold data migration used by the Migration Manager, the current data migration may proceed as scheduled in step 430. This may be indicative of a normal data migration process. In this case, the current data migration may proceed until completion or at least until the data migration detects a performance that falls below an acceptable level in comparison the threshold data migration. As noted above, the Migration Manager may monitor the current data migration in order to detect situations where the performance of the current data migration degrades below the threshold value.

Once a particular data migration has been determined to be performing at a slower than acceptable rate, the Migration Manager terminates the current data migration for that source in step 440. Termination may be desired in order to free up the network so that other sources migrate their data at an acceptable speed may utilize the network as intended. If the continued migration of data from the slow source is allowed, this may negatively impact the data migration of other sources since the network may be tied up for a longer than expected period of time. In some situations, if the network is not stable, prevention of corruption of data being migrated is also desired. Furthermore, using a slower than normal network to migrate data (which may be large is scale), may not be efficient if it takes longer than expected to complete.

In step 450, the data migration for source is rescheduled. The data associated with the data migration still needs to be migrated to the target system. Current situations, however, may not be ideal for continuing the data migration. In some cases, the network conditions may fix itself or improve after some time has elapsed (e.g., repairs to the network, the network becomes less busy, the user no longer works remotely). The rescheduled data migration can be rescheduled for any time after and may be rescheduled over multiple times over a period of time. For example, the Migration Manager may attempt to re-migrate the data from the source what was previously canceled once all other sources in the source system have finished migrating. The Migration Manager may also re-schedule the data migration for the next available time the data may be accessible. In any case, for each rescheduled data migration, the Migration Manager may repeat the steps of the present invention (e.g., steps 410-450) as needed to detect and evaluate if the data migration is acceptable. The method of FIG. 4 may be repeated until data migration for that source has been completed.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for detecting and suppressing slow data migration across WAN connections, the method comprising:
setting a plurality of performance level thresholds based on type of communication network available to a target system, wherein the performance level thresholds set for a first type of communication network is different than the performance level thresholds set for a second type of communication network;
taking measurements of current performance level at different times during a data migration that migrates data from a first type of data source to the target system via the first type of communication network;
evaluating each of the measurements of current performance level against the set performance level thresholds associated with the first type of communication network and the first type of data source;
identifying when one of the current performance level measurements indicates that the data migration is slower than at least one of the performance level thresholds, the at least one performance level threshold defining sub-optimal performance;
terminating the data migration based on the identification; and
rescheduling the data migration for at least one future time.

2. The method of claim 1, wherein the first type of data source is a computing device.

3. The method of claim 2, wherein the computing device is associated with an employee of a business or organization.

4. The method of claim 1, wherein the migrated data includes personal storage tables (PSTs).

5. The method of claim 1, wherein the target system is a hosted Exchange server.

6. The method of claim 1, wherein the data migration migrates data from two or more data sources simultaneously.

7. The method of claim 1, wherein the performance level thresholds are set based on characteristics of the first type of communication network used to perform the data migration.

8. The method of claim 7, wherein the first type of communication network is a private network associated with a business or organization.

9. A system for detecting and suppressing slow data migration across WAN connections, the system comprising:
   a source system of a first type of data source and connected to a communication network of a first type of communication network, wherein the source system stores data to be migrated;
   a target system connected to the communication network, wherein the target system designated to store data migrated from the source system; and
   a migration manager device comprising a processor and instructions stored in memory, wherein the processor executes the instructions to:
     set a plurality of performance level thresholds based on type of communication network available to a target system, wherein the performance level thresholds set for the first type of communication network is different than the performance level thresholds set for a second type of communication network;
     take measurements of current performance level at different times during a data migration that migrates data from the first type of data source to the target system via the first type of communication network;
     evaluate each of the measurements of current performance level against the set performance level thresholds associated with the first type of communication network and the first type of data source;
     identify when one of the current performance level measurements indicates that the data migration is slower than at least one of the performance level thresholds, the at least one performance level threshold defining sub-optimal performance;
     terminate the data migration based on the identification; and
     reschedule the data migration for at least one future time.

10. The system of claim 9, wherein the first type of data source is a computing device.

11. The system of claim 10, wherein the computing device is associated with an employee of a business or organization.

12. The system of claim 9, wherein the migrated data includes personal storage tables (PSTs).

13. The system of claim 9, wherein the target system is a hosted Exchange server.

14. The system of claim 9, wherein the data migration migrates data from two or more data sources simultaneously.

15. The system of claim 9, wherein the performance level thresholds are set based on characteristics of the first type of communication network used to perform the data migration.

16. The system of claim 15, wherein the first type of communication network is a private network associated with a business or organization.

17. A non-transitory computer readable storage medium having embodied thereon a program for implementing a method for detecting and suppressing slow data migration across WAN connections, the method comprising:
    setting a plurality of performance level thresholds based on a type of communication network available to a target system, wherein the performance level thresholds set for a first type of communication network is different than the performance level thresholds set for a second type of communication network;
    taking measurements of current performance level at different times during a data migration that migrates data from a first type of data source to the target system via a first type of communication network;
    evaluating each of the measurements of current performance level against the set performance level thresholds associated with the first type of communication network and the first type of data source;
    identifying when one of the current performance level measurements indicates that the data migration is slower than at least one of the performance level thresholds, the at least one performance level threshold defining sub-optimal performance;
    terminating the data migration based on the identification; and
    rescheduling the data migration to proceed at least one future time.

18. The non-transitory computer-readable storage medium of claim 17, wherein the data migration migrates data from two or more data sources simultaneously.

19. The non-transitory computer-readable storage medium of claim 18, wherein the performance level thresholds are set based on characteristics of the first type of communication network used to perform the data migration.

20. The non-transitory computer-readable storage medium of claim 17, wherein the first type of communication network is a private network associated with a business or organization.

* * * * *